United States Patent
Huang et al.

(10) Patent No.: US 9,116,551 B2
(45) Date of Patent: Aug. 25, 2015

(54) METHOD FOR QUICKLY INPUTTING CORRELATIVE WORD

(75) Inventors: Xiaofeng Huang, Shanghai (CN); Yanjiao Zhao, Shanghai (CN); Xiaoshan Tao, Shanghai (CN)

(73) Assignee: Shanghai Chule (CooTek) Information Technology Co., Ltd., Shanghai (CN)

( * ) Notice: Subject to any disclaimer, the term of this patent is extended or adjusted under 35 U.S.C. 154(b) by 1352 days.

(21) Appl. No.: 12/679,352

(22) PCT Filed: Sep. 22, 2008

(86) PCT No.: PCT/CN2008/072445
§ 371 (c)(1),
(2), (4) Date: Jul. 26, 2010

(87) PCT Pub. No.: WO2009/039786
PCT Pub. Date: Apr. 2, 2009

(65) Prior Publication Data
US 2010/0292984 A1    Nov. 18, 2010

(30) Foreign Application Priority Data
Sep. 21, 2007  (CN) .......................... 2007 1 0046291

(51) Int. Cl.
*G06F 17/20* (2006.01)
*G06F 17/28* (2006.01)
(Continued)

(52) U.S. Cl.
CPC ............ *G06F 3/0236* (2013.01); *G06F 3/0237* (2013.01); *G06F 17/276* (2013.01)

(58) Field of Classification Search
CPC ......... G06F 17/20; G06F 17/21; G06F 17/27; G06F 17/273; G06F 17/2735; G06F 17/28; G06F 17/30
USPC ............... 704/1, 3, 9, 235, 251, 257; 715/257
See application file for complete search history.

(56) References Cited

U.S. PATENT DOCUMENTS

| | | | | |
|---|---|---|---|---|
| 6,064,959 | A | * | 5/2000 | Young et al. ................... 704/251 |
| 6,314,397 | B1 | * | 11/2001 | Lewis et al. .................... 704/235 |
| 6,363,347 | B1 | * | 3/2002 | Rozak ............................ 704/244 |

(Continued)

FOREIGN PATENT DOCUMENTS

| CN | 1106619 | 4/2003 |
|---|---|---|
| CN | 1588277 | 3/2005 |

(Continued)

OTHER PUBLICATIONS

Jiang, Tian-Jian, et al. "OpenVanilla—A Non-Intrusive Plug-In Framework of Text Services." arXiv preprint cs/0508041 (2005).*

(Continued)

*Primary Examiner* — Paras D Shah
(74) *Attorney, Agent, or Firm* — Duane Morris LLP; David T. Xue (57) ABSTRACT

The present invention provides a text input method, which is integrated in a text input program or device supporting word input (e.g., software/hardware keyboard, input method, etc.) and assists a user in easily inputting a word or a phrase (e.g., various tense forms of a verb, etc.) relating to a certain word. The user may fast input a specific word relating to the certain word by a specific operation (e.g., clicking a software or hardware key, moving a screen contact point, etc.) or by a combination of a plurality of operations.

9 Claims, 8 Drawing Sheets

(51) Int. Cl.
*G06F 3/023* (2006.01)
*G06F 17/27* (2006.01)

(56) References Cited

U.S. PATENT DOCUMENTS

| | | | |
|---|---|---|---|
| 6,912,498 B2 * | 6/2005 | Stevens et al. | 704/235 |
| 6,978,421 B1 | 12/2005 | Aida | |
| 7,055,099 B2 * | 5/2006 | Nakagawa | 715/201 |
| 7,130,798 B2 * | 10/2006 | Williamson et al. | 704/235 |
| 7,177,797 B1 * | 2/2007 | Micher et al. | 704/9 |
| 7,224,346 B2 * | 5/2007 | Sheng | 345/171 |
| 7,293,231 B1 * | 11/2007 | Gunn et al. | 345/179 |
| 7,483,829 B2 * | 1/2009 | Murakami et al. | 704/10 |
| 7,562,296 B2 * | 7/2009 | Soin et al. | 715/268 |
| 7,698,326 B2 * | 4/2010 | Thorn | 707/705 |
| 7,778,957 B2 * | 8/2010 | Vuong | 707/603 |
| 7,886,233 B2 * | 2/2011 | Rainisto et al. | 715/773 |
| 7,957,955 B2 * | 6/2011 | Christie et al. | 704/9 |
| 8,074,172 B2 * | 12/2011 | Kocienda et al. | 715/263 |
| 8,311,805 B2 * | 11/2012 | Parikh | 704/9 |
| 8,364,468 B2 * | 1/2013 | Hsu | 704/9 |
| 2004/0030540 A1 * | 2/2004 | Ovil et al. | 704/1 |
| 2004/0153963 A1 * | 8/2004 | Simpson et al. | 715/500.1 |
| 2006/0265668 A1 * | 11/2006 | Rainisto | 715/816 |
| 2007/0033026 A1 * | 2/2007 | Bartosik et al. | 704/233 |
| 2007/0074131 A1 * | 3/2007 | Assadollahi | 715/816 |
| 2007/0226649 A1 * | 9/2007 | Agmon | 715/816 |
| 2007/0260448 A1 * | 11/2007 | Lorenzen et al. | 704/1 |
| 2008/0033713 A1 * | 2/2008 | Brostrom | 704/9 |

FOREIGN PATENT DOCUMENTS

| | | |
|---|---|---|
| CN | 1591417 | 3/2005 |
| CN | 1641643 | 7/2005 |
| CN | 1869897 | 11/2006 |
| CN | 101017396 | 8/2007 |
| CN | 101122840 | 2/2008 |

OTHER PUBLICATIONS

International Search Report of PCT/CN2008/072445, dated Jan. 8, 2009.

* cited by examiner

| Profit | Product | Promise | Prohibit |

METHOD FOR QUICKLY INPUTTING CORRELATIVE WORD

FIELD OF THE INVENTION

The present invention relates to a text input method, and more specifically, to a text input method which is integrated in a text input program or device supporting word input and assists a user in easily inputting a word or a phrase relating to a certain word.

BACKGROUND

In many languages, it is common that some words are relating to other words. For example, in English, the verb "play" has related words such as "plays", "playing", "played". The noun "element" has related words such as "elements". The verb "entertain" is relating to its noun "entertainment" formed by adding a suffix "ment". The verb "wonder" is relating to its adjective "wonderful" formed by adding a suffix "ful".

Relevance means that there is some correlation between two words or phrases. For example, in English, the relevance of words may be as follows:

1. Various tense forms of a verb, e.g., past tense, continuous tense, perfect tense, third person singular form, etc. For example, for the verb "write", the past tense is "wrote", the continuous tense is "writing", the perfect tense is "written", and the third person singular form is "writes", etc.

2. The plural form of a noun. For example, the plural form of "teacher" is "teachers", and the plural form of "mouse" is "mice", etc.

3. Different properties of a word. For example, the verb "entertain" is relevant to its noun form "entertainment". The noun "wonder" is relevant to its adjective form "wonderful". The adjective "similar" is relevant to its noun form "similarity".

4. The comparative degree and the superlative degree of an adjective. For example, the comparative degree of the adjective "smart" is "smarter", and the superlative degree is "smartest".

5. The near-synonym and the antonym of a word. For example, the antonym of "advantage" is "disadvantage", and the near-synonym of "same" is "similar", etc.

6. The possessive form of noun. For example, the possessive form of "we" is "our", the possessive form of "China" is "Chinese", the possessive form of "company" is "company's", etc.

Two or more words with relevance are related words for one another. The foregoing descriptions are merely some examples of the concept of related words. In practice, two words or phrases may be regarded as related words as long as there is relevance between them. In addition to English, such concept of related words also exists in other languages. For example, in Chinese, "I" is relevant to "my". In German, "vollkommen" is relevant to "Verkollkommnung". In French, "roman" is relevant to "romantique".

After an initial word is input, a user may usually desire to input a related word with a fast method. However, the conventional input method fails to meet the requirement. The user has to spell a complete word, which is time-consuming and laborious. For example, after "consume" is inputted, the user cannot input its noun form "consumption" fast.

Some software keyboard and input method may provide a word prediction function. For example, when the user input a word "won", the software keyboard and input method can predict that the user may desire to input the contents "won", "wonder", etc., and indicate the user by providing these predicted words as candidate inputs for user selection. In traditional input methods, the word "wonderful" relating to "wonder" may be the word that the user desires to input, however, the word "wonderful" cannot be displayed as a candidate word due to various condition restrictions. Thus, if the user desires to input "wonderful", the user has to further input more information to help the text input program or device filter other candidate words, so that "wonderful" may meet the requirement for being displayed as a candidate word. Accordingly, the input efficiency is impaired.

SUMMARY

With respect to the above problems, a method for fast inputting a related word is proposed by the present invention, to thereby accelerate the input rate and efficiency, and reduce the key-press times for a user.

According to a first aspect of the present invention, a method for fast inputting a related word is provided. The method includes: a first step of displaying a user editing text; a second step of selecting a word in the editing text and invoking a related word selection mode of the selected word by a specific operation approach; a third step of displaying one or more related words of the selected word; and a fourth step of inputting a user desired related word.

According to a second aspect of the present invention, a method for fast inputting a related word is provided. The method includes: a first step of displaying a user inputting text, and one or more candidate words of an inputting word in said inputting text; a second step of selecting said candidate word based on a user input, and invoking a related word selection mode of the selected candidate word by a specific operation approach; and a third step of inputting a user desired related word.

According to a third aspect of the present invention, a method for fast inputting a related word is provided. The method includes: a first step of displaying a user inputting text and one or more predicted words of an inputting word in said inputting text; a second step of selecting said predicted word based on a user input and invoking a related word selection mode of the selected predicted word by a specific operation approach; and a third step of inputting a user desired related word.

According to a fourth aspect of the present invention, a computer device is provided. The computer device includes: an input apparatus configured to receive a user input text and a user input command; a storage apparatus configured to store a computer program command; a control apparatus configured to accomplish, in the control of the computer program command, each step in the method of any above-mentioned aspect according to the user input command; and a display apparatus configured to display the text.

According to a fifth aspect of the present invention, a device for fast inputting a related word is provided. The device includes: a first apparatus for displaying a user editing text; a second apparatus for selecting a word in the editing text, and invoking a related word selection mode of the selected word by a specific operation approach; a third apparatus for displaying a related word of the selected word; and a fourth apparatus for inputting a user desired related word.

According to a sixth aspect of the present invention, a method for fast inputting a related word is provided. The method includes: a first apparatus for displaying a user inputting text, and one or more candidate words of an inputting word in said inputting text; a second apparatus for selecting the candidate word based on a user input, and invoking a related word selection mode of the selected candidate word by a specific operation approach; and a third apparatus for inputting a user desired related word.

DETAILED DESCRIPTION OF THE PREFERRED EMBODIMENT

Figure 1:
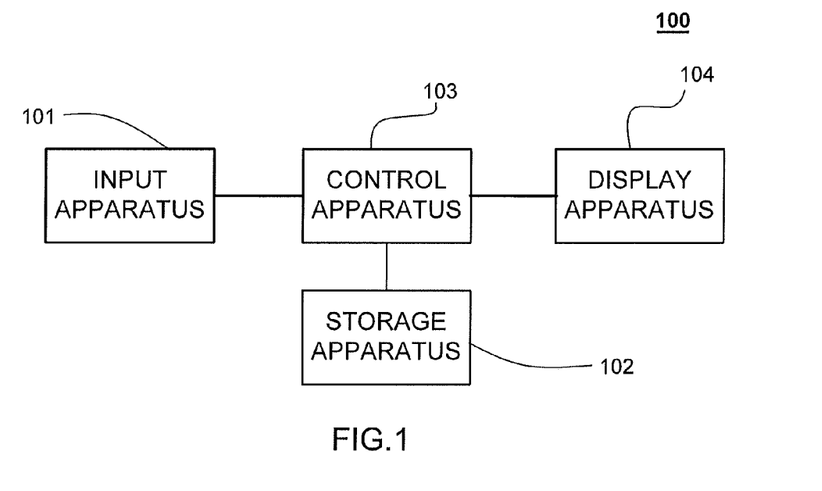
FIG. 1 is a basic block diagram illustrating a computer device or portable terminal device 100 which is applicable to the text input method of the present invention.

FIG. 1 is a basic block diagram illustrating a computer device or portable terminal device 100 which is applicable to the text input method of the present invention. A user input apparatus 101 is configured to receive a user input command. The user input apparatus 101 includes a touch screen, or an electronic device screen equipped with a pointing system (e.g., a mouse, an induction plate, etc.). A storage apparatus 102 stores basic program commands that support routine work for the computer device or portable terminal device, e.g., operating system, common software, etc. In addition, the storage device 102 further stores computer program commands for implementing a text input method according to the following embodiments of the present invention. Moreover, the storage apparatus 102 further stores related information that connects each word with its related words, word frequency, and user configuration information, etc. A control apparatus 103 may be implemented by any kind of microprocessor, micro control and programmable logic element, dedicated integrated circuit or similar device in the conventional art. The control device 103 is configured to implement the below text input method according to the present invention. A display apparatus 104 is configured to provide the user with a visional interface illustrating a user input text, together with a word, a candidate word, a predicted word, a related word, and a control process thereof, which are to be mentioned below. The display apparatus may be separated from the user input apparatus 101, or may be integrated with the user input apparatus 101, e.g., a touch and display plate.

The following embodiments are specifically illustrated for a better understanding of the technical contents of the present invention.

Embodiment One

Figure 2A:
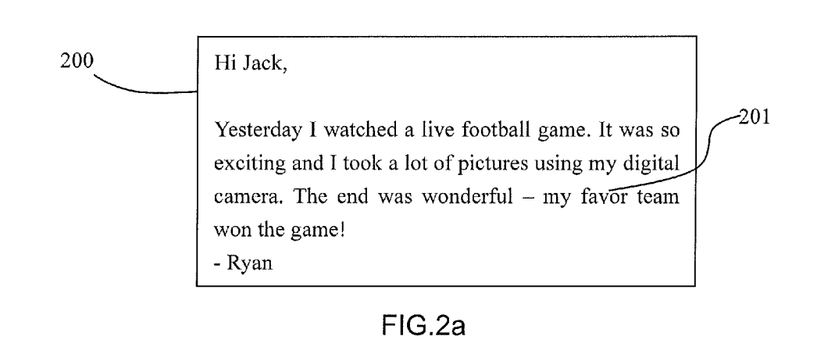
FIG. 2a is a schematic illustrating a text before editing according to a first embodiment of the present invention.

FIG. 2a illustrates a part of text in an edit status which is displayed in a screen 200. The user desires to change a word 201 "favor" to its adjective form "favorite". In the screen of the touch screen, the user may press the area where the word 201 locates with a finger or a stylus, and may enter a related word selection mode by a specific motion (e.g., sliding downward).

Figure 2B:
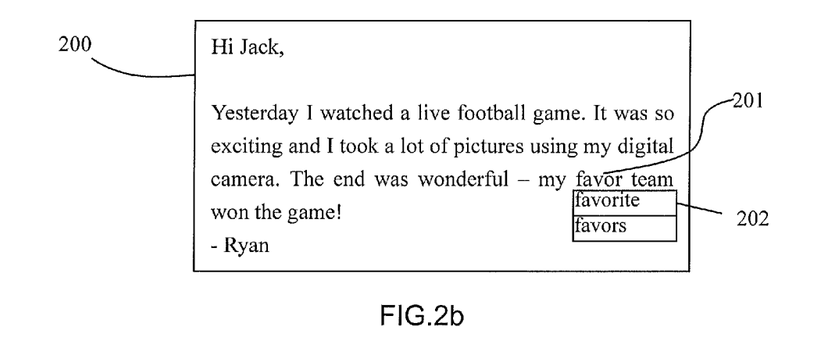
FIG. 2b is a schematic illustrating a related word selection interface according to the first embodiment of the present invention.
Figure 2C:
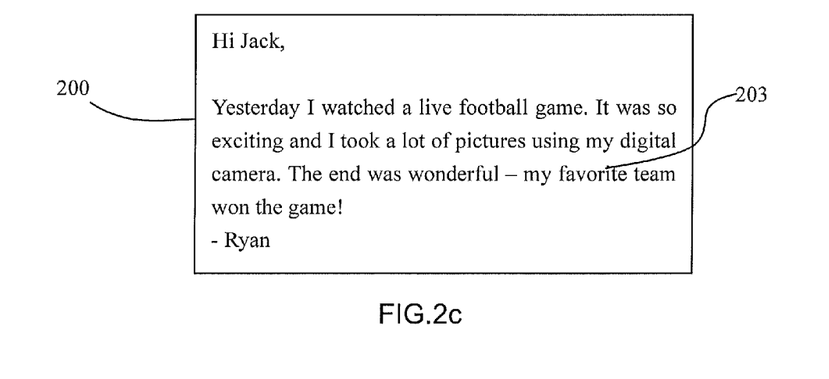
FIG. 2c is a schematic illustrating a text after editing according to the first embodiment of the present invention.

FIG. 2b illustrates an interface presented to the user in a related word selection mode. A related word list 202 is presented under the word 201 "favor", and lists all the related words of the word 201, e.g., favorite, favors, etc. The user may click a desired related word, "favorite" in this example. Then, the system may replace the word 201 "favor" by the word 203 "favorite", as shown in FIG. 2c.

If the screen 200 is associated with a device having a keyboard, the user may also enter the related word selection mode as shown in FIG. 2b by moving the cursor to the word 201 and then pressing a pre-specified key (e.g., an Enter key). Next, the user may select a desired related word by moving the cursor upward or downward via a direction key, and then press another pre-specified key (e.g., an Enter key), and input the related word into the text, as shown in FIG. 2c.

Figure 3:
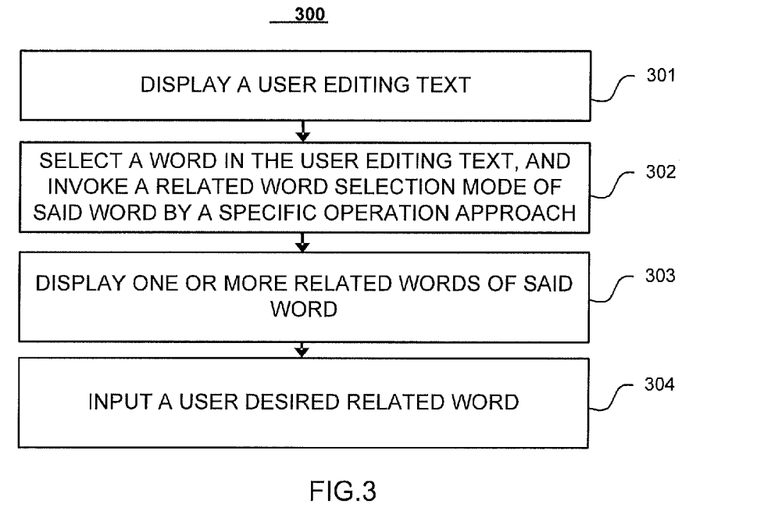
FIG. 3 is a flowchart illustrating a related word input procedure according to the first embodiment of the present invention.

FIG. 3 is a flowchart illustrating a related word input procedure 300 according to the first embodiment of the present invention. The procedure includes the following steps. Step 301: Display a user editing text. Step S302: Select a word in the user editing text, and invoke a related word selection mode of said word by a specific operation approach. Step 303: Display the related words of said word. Step 304: Input a user desired related word.

In terms of step 301, the specific operation approach for entering the related word selection mode may be implemented in various ways. For example, operations performed on a touch screen, or an electronic device screen equipped with a pointing system (e.g., a mouse, an induction plate, etc.)

include: clicking the word, double-clicking the word, sliding a contact point along a certain direction after pressing the word, long pressing the word over a specified period, hovering a mouse over a candidate word over a specified period, right-clicking the word by the mouse, or any kind of predetermined motion or mouse action. For another example, operations performed on an electronic device screen equipped with a keyboard (including hardware keyboard and software keyboard) or equipped with a key-press include: pressing a specified key (e.g., Enter key, direction key, special function key) after moving the cursor to the word; pressing specified combined keys (e.g., simultaneously press CTRL+ NUMBER, or first press key A and then press key B within a specified period) after moving the cursor to the word; moving the cursor to the word and then hovering over the word over a specified period.

In terms of step 302, there are various ways for displaying a related word. For example, displaying a list of all related words horizontally in an area near the word or in a specified area on the screen; displaying a list of all related words vertically in an area near the word or in a specified area on the screen.

Figure 4:
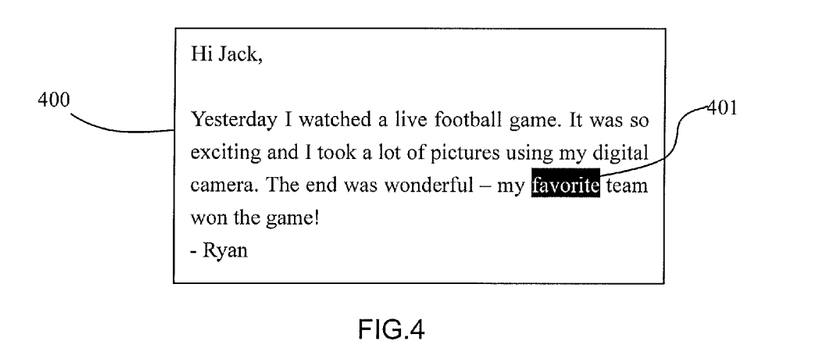
FIG. 4 is a schematic illustrating another related word selection interface according to the first embodiment of the present invention.

After the related word display mode is entered, a selected word is highlighted, and the selected word is switched among different related words via a specified key (e.g., direction key of up, down, left or right). As shown in FIG. 4, an original word is "favor". After the user enters the related word mode via step 301 and step 302, the present related word displayed at the screen is a word 401 "favorite".

In terms of step 304, there are various ways for inputting a user desired related word. For example, clicking the related word, or pressing a confirmation key after the cursor is moved to the specified related word, etc.

Although the related word input procedure 300 includes a series of steps performed in sequence, apparently, the procedure may include more or less steps, and the steps may be performed in series or in parallel (e.g., using a multithread processor), or several steps may be combined into one step. Moreover, in addition to the various ways for implementing each step mentioned above, it is readily appreciated by those skilled in the art that other ways (e.g., changing the key-press input into a voice input) may be adopted for implementing a certain step, while not compromising the essential of the related word input procedure according to present invention.

Embodiment Two

Some input methods may have the function of displaying a candidate word list based on a user input.

Figure 5:
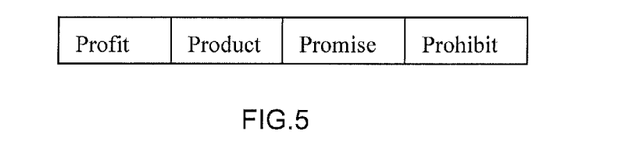
FIG. 5 is a schematic illustrating a candidate word list according to a second embodiment of the present invention.

For example, when the user input "pro" via a hardware keyboard, a candidate word list is automatically predicted and displayed according to the input method, as shown in FIG. 5. The list may be arranged horizontally or vertically, and may be presented at a fixed position in the screen, or may be presented at an area near the current input word (e.g., below the cursor).

Figure 6:
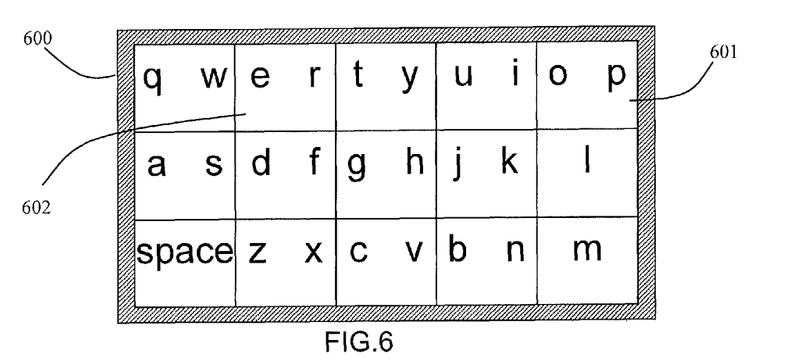
FIG. 6 is a schematic illustrating a first software keyboard according to the second embodiment of the present invention.

For another example, in a software/hardware keyboard 600 as shown in FIG. 6, two letters share one key. When the user presses key 601, key 602 and key 601 in sequence, the candidate word list as shown in FIG. 5 is automatically predicted and displayed according to the input method.

Figure 7:
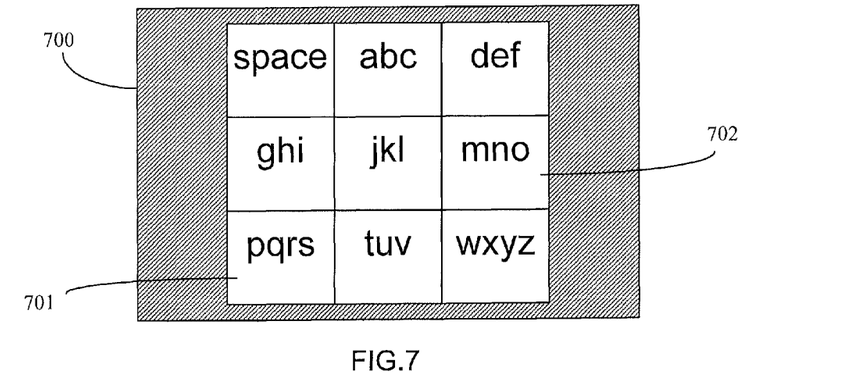
FIG. 7 is a schematic illustrating a second software keyboard according to the second embodiment of the present invention.

For another example, in a software/hardware keyboard 700 as shown in FIG. 7, three or more letters share one key. When the user presses key 701, key 701 and key 702 in sequence, the candidate word list as shown in FIG. 5 is automatically predicted and displayed according to the input method.

Figure 8:
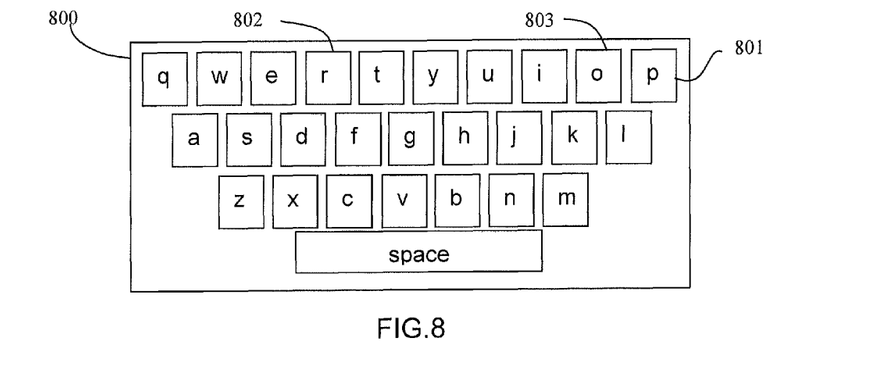
FIG. 8 is a schematic illustrating a third software keyboard according to the second embodiment of the present invention.

Yet for another example, in a software/hardware keyboard 800 as shown in FIG. 8, each letter occupies one key. When the user presses key 801 "p", key 802 "r" and key 803 "o" in sequence, the candidate word list as shown in FIG. 5 is automatically predicted and displayed according to the input method.

In general cases, the user may select a candidate word by clicking the candidate word or a specified key. However, in the cases that the user desired word is not a candidate word but a related word of a certain candidate word, the traditional text input methods fail to perform a fast input.

The present embodiment provides a text input method, with which the user may select a related word of the candidate word, and thereby accelerating the input.

For example, in the candidate word list as shown in FIG. 5, the user desires to input "productivity", i.e., a related word of the candidate word "product". In a touch screen, the user may press the candidate word "product" with a finger or a stylus, and may enter a related word selection mode by a specific motion (e.g., sliding downward).

Figure 9:
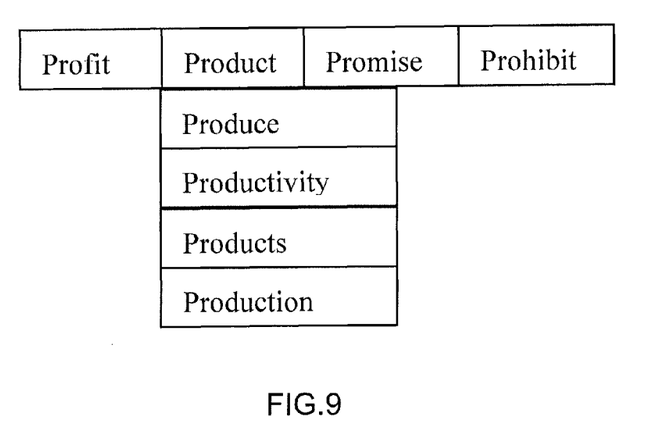
FIG. 9 is a schematic illustrating an interface presented to a user in a related word selection mode according to the second embodiment of the present invention.

FIG. 9 illustrates an interface presented to the user in a related word selection mode. All the related words of "Product" are presented in a list below "Product". After the user clicks the related word "Productivity" that he desires to input, the word is then input to the current editing text.

Without the related word input method of the present invention, the user has to press twelve keys for inputting the word "productivity". According to the present invention, the user may input the word by merely pressing three keys together with two selection actions. Thus, the input efficiency is significantly increased.

In many cases, the user needs a faster method for inputting some common related words, e.g., the plural form of a noun, various tense forms of a verb, etc. At this point, the steps of related word list may be bypassed via fast input, and thereby a user specified related word may be selected directly. For example, in the candidate area as shown in FIG. 5, the user may slide a contact point rightward from the position of the word "Product", and directly input the word's plural form "Products".

If the device has a keyboard, the user may also enter the related word selection mode as shown in FIG. 9 by moving the cursor to the word "Product" and then pressing a pre-specified key (e.g., an Enter key). Next, the user may select a desired related word by moving the cursor upward or downward via a direction key, and then press another pre-specified key (e.g., a space key), and input the related word into the text.

Figure 10:
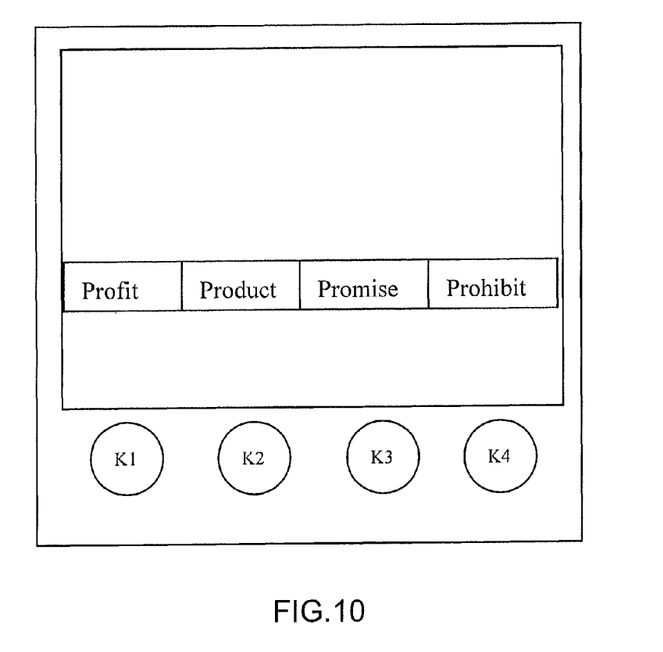
FIG. 10 is a schematic illustrating a device with a keyboard in a related word selection mode by entering a shortcut key according to the second embodiment of the present invention.

If the device has a keyboard, as shown in FIG. 10, the user may directly enter the related word selection mode in FIG. 10 via a key corresponding to each candidate word. For example, in FIG. 10, each candidate word corresponds to a shortcut key, K1, K2, K3 and K4, respectively. After pressing K2, the user enters a related word selection mode of the word "Product".

Figure 11:
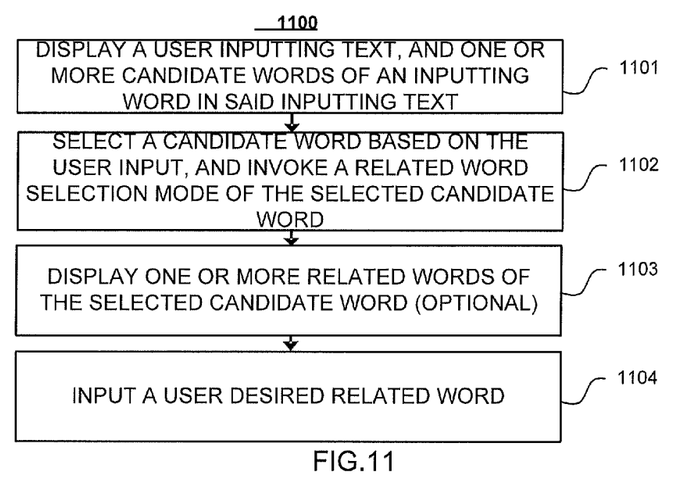
FIG. 11 is a flowchart illustrating a related word input procedure according to the second embodiment of the present invention.

FIG. 11 is a flowchart illustrating a related word input procedure 1100 according to the second embodiment of the present invention. The procedure includes the following steps. Step 1101: Display a user inputting text, and one or more candidate words of an inputting word in said inputting text. Step S1102: Select a candidate word based on the user input, and invoke a related word selection mode of the selected candidate word. Step 1103 (optional): Display one or more related words of the selected candidate word. Step 1104: Input a user desired related word.

In terms of step 1102, operation approaches for entering the related word selection mode may be implemented in various ways. For example, operations performed on a touch screen, or an electronic device screen equipped with a pointing system (e.g., a mouse, an induction plate, etc.) include: clicking the candidate word, double-clicking the candidate word, sliding a contact point along a certain direction after press the candidate word, long pressing the candidate word over a specified period, hovering a mouse over the candidate word over a specified period, right-clicking the candidate word by the mouse, or any kind of predetermined motion or mouse action. Still, for example, operations performed on an electronic device screen equipped with a keyboard (including hardware keyboard and software keyboard) or equipped with a key-press include: moving the cursor to the candidate word; pressing a specified key (e.g., Enter key, direction key, special function key, etc.) after moving the cursor to the candidate word; pressing specified combined keys (e.g., simultaneously press CTRL+NUMBER, or first press key A and then press key B within a specified period) after moving the cursor to the candidate word; moving the cursor to the candidate word and then hovering over the candidate word over a specified period; each candidate word corresponds to a key, e.g., four candidate words correspond to keys K1-K4 respectively, where K1-K4 may be shortcut keys of the device, or may be combination keys CTRL+1 to CTRL+5.

In terms of step 1103, there are various ways for displaying a related word. For example, displaying a list of all related words horizontally in an area near the candidate word or in a specified area on the screen; displaying a list of all related words vertically in an area near the candidate word or in a specified area on the screen.

The step 1103 is optional. When the user inputs the related word in a shortcut way, the step 1103 for displaying the related word may be bypassed. For example, the plural form of the word may be selected by sliding a contact point rightward from the candidate word.

In terms of step 1104, there are various ways for inputting a user desired related word. For example, click the listed related word; or press a confirmation key after the cursor is moved to the specified related word; slide on the candidate word for a direct selection with a mouse or contact point motion, e.g., the plural form of the word may be selected by sliding a contact point rightward from the candidate word; directly select the related word with a specified shortcut key, e.g., candidate words 1-4 correspond to shortcut keys K1-K4 respectively.

Although the related word input procedure 1100 includes a series of steps performed in sequence, apparently, the procedure may include more or less steps, and the steps may be performed in series or in parallel (e.g., using a multithread processor), or several steps may be combined into one step. Moreover, in addition to the various ways for implementing each step mentioned above, it is readily appreciated by those skilled in the art that other ways (e.g., changing the key-press input into a voice input) may be adopted for implementing a certain step, while not compromising the essential of the related word input procedure according to present invention.

Embodiment Three

The present embodiment illustrates a method for predicting a subsequent input at the cursor position based on the user input and selecting a related word.

Figure 12A:
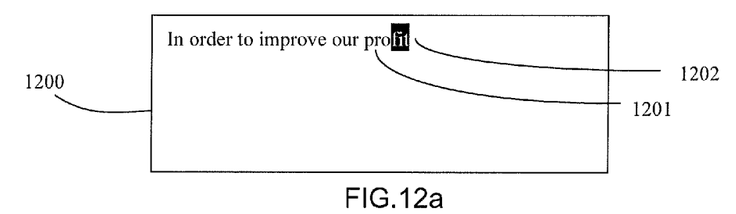
FIG. 12a is a schematic illustrating a predicted word display mode according to a third embodiment of the present invention.

For example, in a text editing area 1200 shown in FIG. 12a, when the user inputs a text 1201 "pro", the input method may look up words with the initial "pro" in a dictionary and automatically predict the input word as "profit", and display a rest part of the text 1202 "fit" in another form. In this example, "pro" is the user input, and "profit" is the predicted word. The predicted word and the candidate word in the Embodiment Two differs in that, only one predicted word is display at the same time, whereas one or more candidate words are generally displayed at the same time. Usually, the predicted word is the candidate word with highest word frequency.

Figure 12B:
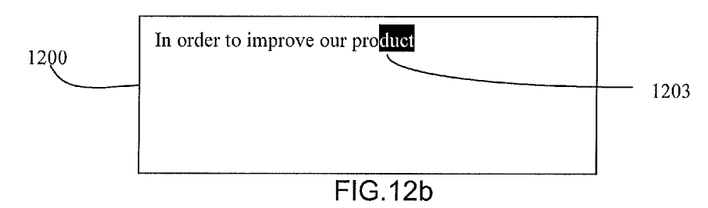
FIG. 12b is a schematic illustrating a predicted word switching mode according to the third embodiment of the present invention.

However, the user may actually desire to input a word "productivity". The user may change the predicted word by a specified operation (e.g., pressing an upward or downward direction key). For example, the user may press a downward key and change the predicted word to a word 1203 "product", as shown in FIG. 12b.

Figure 12C:
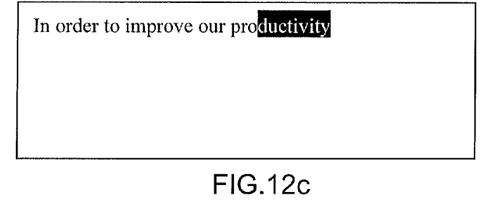
FIG. 12c is a schematic illustrating a related word display mode according to the third embodiment of the present invention.

Next, the user finds that "productivity" is a related word of the predicted word "product". Therefore, the user may switch among various related words (e.g., products, production, etc.) of "product" by another specified operation (e.g., pressing a leftward or rightward direction key), until "productivity" is reached, as shown in FIG. 12c. At this point, the user may press a space key or an Enter key for confirmation.

Figure 13A:
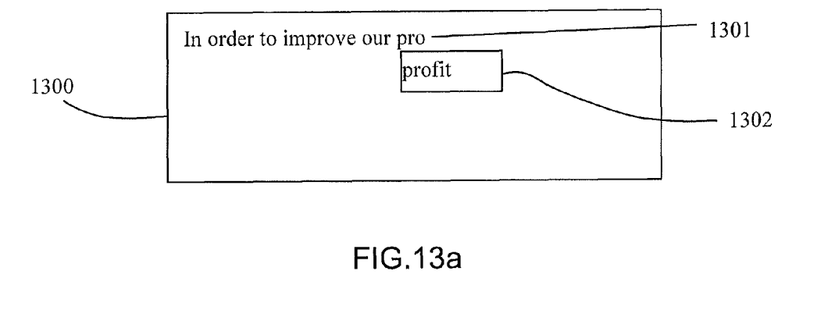
FIG. 13a is a schematic illustrating another predicted word display mode according to the third embodiment of the present invention.

Still, for example, in a text editing area 1300 shown in FIG. 13a, when the user inputs a text 1301 "pro", the input method may automatically predict that the input word is 1302 "profit", and may display the predicted word 1302 in an area near the cursor (e.g., below the cursor).

Figure 13B:
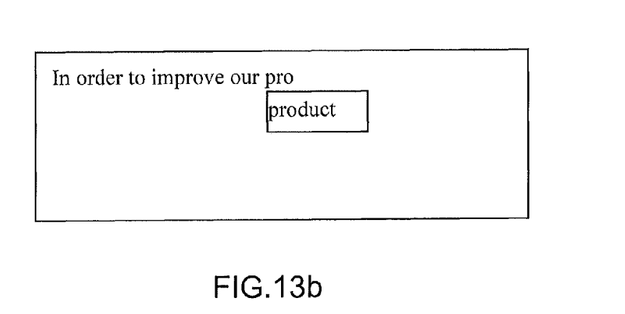
FIG. 13b is a schematic illustrating another predicted word switching mode according to the third embodiment of the present invention.

However, the user may actually desire to input a word "productivity". The user may then change the predicted word by a specified operation (e.g., pressing an upward or downward direction key). For example, the user may press a downward key and change the predicted word to a word "product", as shown in FIG. 13b.

Figure 13C:
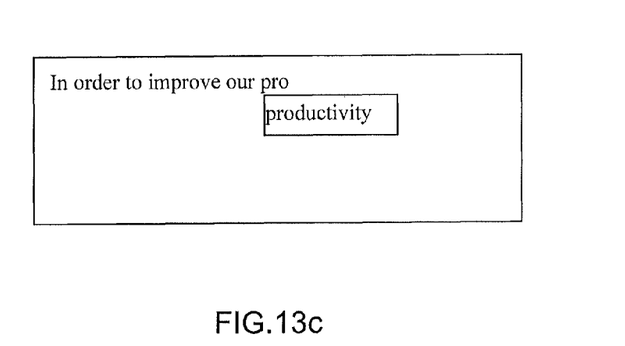
FIG. 13c is a schematic illustrating another related word display mode according to the third embodiment of the present invention.

Finally, the user finds that "productivity" is a related word of the predicted word "product". Therefore, the user may switch among various related words (e.g., products, production, etc.) of "product" by another specified operation (e.g., pressing a leftward or rightward direction key), until "productivity" is reached, as shown in FIG. 13c. At last, the user may press a space key or an Enter key for confirmation.

Figure 14:
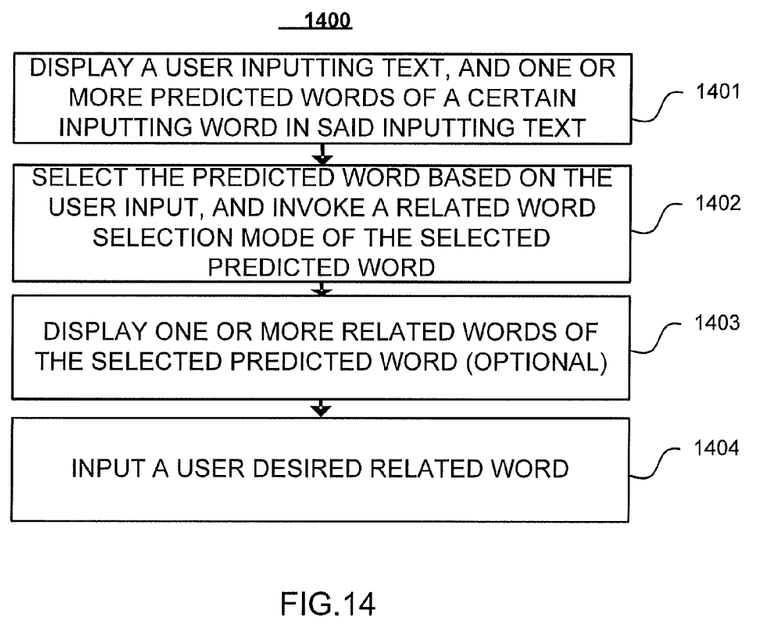
FIG. 14 is a flowchart illustrating a related word input procedure according to the third embodiment of the present invention.

FIG. 14 is a flowchart illustrating a related word input procedure 1400 according to the third embodiment of the present invention. The procedure includes the following steps. Step 1401: Display a user inputting text, and one or more predicted word of a certain inputting word in said inputting text. Step S1402: Select the predicted word based on the user input, and invoke a related word selection mode of the selected predicted word. Step 1403 (optional): Display one or more related words of the selected predicted word. Step 1404: Input a user desired related word.

In terms of step 1401, there are various ways for displaying a predicted word. For example, display a rest part of the predicted word following the user input, as shown in FIG. 12a; display the predicted word in an area near (above or below) the user input, as shown in FIG. 13a; display the predicted word at a fixed area in the screen.

In terms of step 1402, there are various ways for selecting a predicted word based on the user input. For example, the user may click some keys (e.g., an upward or downward direction key) on a hardware keyboard or a software keyboard for switching the predicted word; the user may use a scroll wheel on the device (e.g., a scrolling key on some mobile phones) for switching the predicted word; use a specified motion or mouse action on a touch screen or a screen with the mouse system (e.g., sliding rightward within the screen area indicates switching to another predicted word).

In terms of step 1403, there are various ways for displaying a related word. For example, displaying a list of all related words horizontally in an area near the predicted word or in a specified area on the screen; displaying a list of all related words vertically in an area near the predicted word or in a specified area on the screen; displaying a related word at the original position of the predicted word.

The step 1403 is optional. When the user inputs the related word in a shortcut way, the step 1403 may be bypassed. For example, the plural form of the word may be selected by sliding a contact point rightward from the predicted word.

In terms of step 1404, the user may input a desired related word in various ways. For example, the user may click some keys (e.g., a leftward or rightward direction key) on a hardware keyboard or a software keyboard for switching the related word; the user may use a scroll wheel on the device (e.g., a scrolling key on some mobile phones) for switching the related word; use a specified motion or mouse action on a touch screen or a screen with the mouse system (e.g., sliding downward within the screen area indicates switching to another related word).

Although the related word input procedure 1400 includes a series of steps performed in sequence, apparently, the procedure may include more or less steps, and the steps may be performed in series or in parallel (e.g., using a multithread processor), or several steps may be combined into one step. Moreover, in addition to the various ways for implementing each step mentioned above, it is readily appreciated by those skilled in the art that other ways (e.g., changing the key-press input into a voice input) may be adopted for implementing a certain step, while not compromising the essential of the related word input procedure according to present invention.

All the foregoing embodiments are based English. It is apparent that the methods for inputting a related word described in the present invention are not limited to one language model. For example, in Chinese, "I" is relevant to "my". In German, "vollkommen" is relevant to "Verkollkommnung". In French, "roman" is relevant to "romantique". Therefore, a person of ordinary skill in the art may implement the methods for inputting a related word in other languages.

It is appreciated by a person of ordinary skill in the art that various modifications, combinations, recombinations or equivalents may be made to the embodiments of the present invention according to design requirements or other factors, as long as these modifications, combinations, recombinations or equivalents fall within the scope of the appended claims and the equivalent scope of the claims.

What is claimed is:

1. A method for fast inputting a related word, comprising:
  displaying, via a display apparatus, one or more user inputting characters, wherein, the user inputting characters are less than for a full word;
  displaying, via a display apparatus, one or more candidate words of the inputting characters;
  accepting a word selected from said candidate words, if a first predetermined mouse motion or first contact point action is detected,
  displaying, via a control apparatus in the control of a computer program command stored in a storage apparatus, and allowing a change to the candidate word if a second predetermined mouse motion or second contact point action is detected different from the first predetermined mouse motion or first contact point action,
  generating and displaying a plurality of related words based on the selected word, if a different third predetermined mouse motion or third contact point action is detected other than the first and second predetermined mouse motion and the first and second contact point action on the selected word,
  wherein the plurality of related words are grammatical varieties of the selected word, each comprising at least a portion of the selected word and is consistent in meaning with the selected word, wherein the at least portion of the selected word and the grammatical varieties are determined from tense forms of a verb, plural forms of a noun, comparative and superlative degrees of the selected word, the grammatical varieties being generated based on the direction of the third predetermined mouse motion or third contact point action by a user; and
  accepting, via an input apparatus, a related word from the plurality of related words upon a further mouse motion or contact point action.

2. The method of claim 1, before accepting, via an input apparatus, a related word from the one or more related words further comprising:
  displaying the one or more related words of the selected word.

3. The method of claim 1, wherein:
  each mouse motion or contact point action comprises an operation performed on a touch screen or on an electronic device screen equipped with a pointing system, the operation comprising: clicking the word, double-clicking the word, sliding a contact point along a direction after pressing the word, long pressing the word over a specified period, hovering a mouse over a candidate word over a specified period, right-clicking the word by the mouse, or any kind of predetermined motion or mouse action.

4. The method of claim 1, wherein:
  each mouse motion or contact point action comprises an operation performed on an electronic device screen equipped with a keyboard or a key-press, the operation comprising: pressing a specified key or specified combined keys, or hovering over the word over a specified period after moving a cursor to the word.

5. The method of claim 1, wherein, accepting, via an input apparatus, the related word from the one or more related words: upon a further mouse motion or contact point action comprises inputting the related word by one of the following approach: clicking the related word; pressing a confirmation key after moving a cursor to the specified related word; sliding on the word or the candidate word or the predicted word for a direct selection with a mouse or contact point motion; directly selecting with a specified shortcut key.

6. A computer device, comprising:
  an input apparatus configured to receive a user input text and a user input command;
  a storage apparatus configured to store a computer program command;
  a control apparatus, configured to accomplish, in the control of the computer program command, each step in the method of claim 1 according to the user input command; and
  a display apparatus configured to display the text.

7. The method of claim 1, further comprising detecting a mouse motion or contact point action upon the selected word to directly generate and display one of the related words without selection.

8. The method of claim 1, wherein, displaying, via a display apparatus, one or more candidate words of the inputting characters comprises:
  displaying, via a display apparatus, the word with highest word frequency among candidate words.

9. A device for fast inputting a related word, comprising:
  a first apparatus for displaying one or more user inputting characters, wherein, the user inputting characters are less than for a full word, and one or more candidate words of the inputting characters;

a second apparatus for accepting a word selected from said candidate words, if a first predetermined mouse motion or first contact point action is detected, displaying, via a control apparatus in the control of a computer program command stored in a storage apparatus, and allowing a change to the candidate word if a second predetermined mouse motion or second contact point action is detected different from the first predetermined mouse motion or first contact point action, generating and displaying a plurality of related words based on the selected word, if a third different predetermined mouse motion or third contact point action is detected other than the first and second predetermined mouse motion and the first and second contact point action on the selected word, wherein, the plurality of related words are grammatical varieties of the selected word, each comprising at least a portion of the selected word and is consistent in meaning with the selected word, wherein the at least portion of the selected word and the grammatical varieties are determined from tense forms of a verb, plural forms of a noun, comparative and superlative degrees of the selected word, the grammatical varieties being generated based on the direction of the third predetermined mouse motion or third contact point action by a user; and a third apparatus accepting a related word from the plurality of related words upon a further mouse motion or contact point action.

* * * * *